(12) United States Patent
Yu

(10) Patent No.: US 12,337,230 B2
(45) Date of Patent: Jun. 24, 2025

(54) GAME CONTROLLER AND KEY THEREOF

(71) Applicant: SHENZHEN GULI TECHNOLOGY CO., LTD., Shenzhen (CN)

(72) Inventor: Hongyong Yu, Shenzhen (CN)

(73) Assignee: SHENZHEN GULI TECHNOLOGY CO., LTD., Shenzhen (CN)

( * ) Notice: Subject to any disclaimer, the term of this patent is extended or adjusted under 35 U.S.C. 154(b) by 210 days.

(21) Appl. No.: 18/035,929

(22) PCT Filed: Apr. 29, 2021

(86) PCT No.: PCT/CN2021/090846
§ 371 (c)(1),
(2) Date: May 9, 2023

(87) PCT Pub. No.: WO2022/160488
PCT Pub. Date: Aug. 4, 2022

(65) Prior Publication Data
US 2023/0415032 A1  Dec. 28, 2023

(30) Foreign Application Priority Data
Jan. 27, 2021  (CN) .......................... 202120233140.9

(51) Int. Cl.
*A63F 13/00* (2014.01)
*A63F 13/24* (2014.01)
(52) U.S. Cl.
CPC ..................... *A63F 13/24* (2014.09)
(58) Field of Classification Search
None
See application file for complete search history.

(56) References Cited

U.S. PATENT DOCUMENTS

| 5,107,083 A | * | 4/1992 | Yagi | ...................... | H01H 13/70 |
| | | | | | 200/530 |
| 5,889,242 A | * | 3/1999 | Ishihara | ................. | G05G 9/047 |
| | | | | | 200/6 A |

(Continued)

FOREIGN PATENT DOCUMENTS

| CN | 104576141 A | 4/2015 |
| CN | 105355496 A | 2/2016 |

(Continued)

OTHER PUBLICATIONS

CN105355496A translation (Year: 2016).*
CN205069465U translation (Year: 2015).*
Translation written opinion May 2003 p. 3 (Year: 2023).*

*Primary Examiner* — Paul A D'Agostino
(74) *Attorney, Agent, or Firm* — Bayramoglu Law Offices LLC

(57) ABSTRACT

A game controller key includes a base, a casing and a key switch. The casing is fastened to the base to form a cavity; the key switch is disposed in the cavity; the top of the key switch is exposed from a surface of the casing; conductive silica gel is installed at the bottom of the key switch; a through hole is provided at a position on the base that corresponds to the conductive silica gel; a spring is installed between the key switch and the base; a side wall of the key switch is provided with a first bump; a plate body is installed on the base; a gap is present between each of two sides of the plate body and the base; and the plate body is provided with a second bump matching the first bump. The spring is used for controlling the force of the key.

20 Claims, 3 Drawing Sheets

(56) References Cited

U.S. PATENT DOCUMENTS

| | | | | |
|---|---|---|---|---|
| 6,160,225 | A * | 12/2000 | Isikawa | H01H 25/04 200/7 |
| 6,344,618 | B1 * | 2/2002 | Sato | H01H 25/041 200/6 A |
| 6,906,700 | B1 * | 6/2005 | Armstrong | G05G 9/04737 345/161 |
| 8,698,021 | B2 * | 4/2014 | Chu | H01H 1/5805 200/345 |
| 10,014,602 | B2 | 7/2018 | Pizzato et al. | |
| 10,515,508 | B2 * | 12/2019 | Brandau | H01H 13/023 |
| 2004/0118669 | A1 * | 6/2004 | Mou | H01H 9/12 200/310 |

FOREIGN PATENT DOCUMENTS

| | | |
|---|---|---|
| CN | 205069465 U | 3/2016 |
| CN | 109786155 A | 5/2019 |
| DE | 3836013 A1 | 4/1990 |
| EP | 3758038 A1 | 12/2020 |
| JP | 10440432 U | 4/1992 |

\* cited by examiner

GAME CONTROLLER AND KEY THEREOF

CROSS-REFERENCE TO THE RELATED APPLICATIONS

This application is the national phase entry of International Application No. PCT/CN2021/090846, filed on Apr. 29, 2021, which is based upon and claims priority to Chinese Patent Application No. 202120233140.9, filed on Jan. 27, 2021, the entire contents of which are incorporated herein by reference.

TECHNICAL FIELD

The present application relates to the technical field of game controller keys, and particularly relates to a game controller and a key thereof.

BACKGROUND

There are two game controller keys on the market, namely, a conventional conductive silica gel key and a microswitch key.

The two game controller keys have the following advantages and disadvantages:

the conductive adhesive key is good in hand feeling, mute, and rapid in springback, but a silica gel structure is prone to fatigue and breakage, and short in service life which is generally below 2 million times; and the consistency is poor during production, the force is inconsistent, and the difference range is large.

the microswitch key is good in force consistency, the service life can reach 5 million times, which is long relative to conductive adhesive, but the key is short in stroke, clear and melodious in sound and poor in hand feeling.

SUMMARY

An objective of the present application is to provide a game controller and a key thereof to solve the problems above.

In order to achieve the objective of the present application, the following technical solution is adopted:

In a first aspect, the present application provides a game controller key, which includes a base, a casing and a key switch. The casing is fastened to the base to form a cavity; the key switch is disposed in the cavity; the top of the key switch is exposed from a surface of the casing; conductive silica gel is installed at the bottom of the key switch; a through hole is provided at a position on the base that corresponds to the conductive silica gel; a spring is installed between the key switch and the base; a side wall of the key switch is provided with a first bump; a plate body is installed on the base; a gap is present between each of two sides of the plate body and the base; and the plate body is provided with a second bump matching the first bump.

Further, the key switch includes a cross switch, a switch shell and a sleeve; the cross switch is installed on the top of the switch shell; the sleeve is installed at the bottom of the switch shell; the conductive silica gel is installed in the sleeve; the top of the cross switch is exposed from the surface of the casing; a spring is installed between the switch shell and the base; and the first bump is disposed on the side wall of the switch shell.

Further, the game controller key includes a dustproof cap, and the dustproof cap sleeves and disposed outside the cross switch and is connected with the switch shell.

Further, the casing is detachably connected with the base.

Further, a clamping groove is formed on the casing; and a clamping hook matching the clamping groove is installed on the base.

Further, the casing and the base are rectangular.

Further, the switch shell is rectangular.

Further, the first bump and the second bump are semi-spherical.

Further, the first bump and the second bump are both made of polyformaldehyde (POM) plastic.

Further, a step is disposed at the bottom of the base.

Further, the end, away from the casing, of the plate body is connected to the base, and the plate body and the base are of an integrated structure.

Further, the surface of the first bump and the surface of the second bump are both curved surfaces.

Further, the through hole is formed in the casing, the cross switch and the dustproof cap are exposed from the through hole which extends out of the casing, and the outer surface of the dustproof cap is attached to the inner surface of the through hole of the casing.

Further, the cross switch, the dustproof cap, the switch shell and the sleeve are of an integrated structure.

In a second aspect, the present application further provides a game controller which includes the game controller key.

By adopting the technical solution above, the present application has the following beneficial effects:

I. The spring is used for controlling the force of the key, the characteristics of good production consistency and long service life of the spring are utilized, and the force of the spring can be conveniently adjusted, so that various keys with different forces can be conveniently produced.

II. The side wall of the key switch is provided with the first bump, the plate body is installed on the base, the gap is present between each of two sides of the plate body and the base plate, and the plate body is provided with the second bump matching the first bump, so that when the key switch is pressed, the force curve of a traditional conductive adhesive can be completely simulated.

III. The bottom of the key switch is made of integral conductive silica gel, so that the hand feeling and the mute are guaranteed; and because the design of a traditional silica gel bowl is omitted, the silica gel bowl structure part which is most prone to breakage is avoided.

IV. The key switch is independently made, and meanwhile, the problems of key clamping, abrasion and uneven pressing of a key cap of a traditional game controller key are solved. And, V. the key switch is independently made, so that the key cap can be conveniently replaced, and rapid mass production and personalized customization are realized.

BRIEF DESCRIPTION OF THE DRAWINGS

To describe the technical solutions in the embodiments of this present application or in existing technologies more clearly, the accompanying drawings required for describing the embodiments or existing technologies are briefly described below. Apparently, the accompanying drawings in the following description show some embodiments of this present application, and an ordinary person skilled in the art may still derive other drawings from these accompanying drawings without creative efforts.

Signs in figures: 1—base; 2—casing; 3—key switch; 4—conductive silica gel; 5—spring; 6—first bump; 7—plate body; 8—gap; 9—second bump; 31—cross switch; 32—switch shell; 33—sleeve; 10—dustproof cap; 21—clamping groove; 11—clamping hook; and 12—step.

DETAILED DESCRIPTION OF THE EMBODIMENTS

In order to enable those in the technical field to better understand the present application solutions, the technical solutions in the embodiment of the present application will be clearly and completely described in combination with the drawings in the embodiment of the present application. Obviously, the described embodiment is only a part of the embodiments of the present application, not all of the embodiments. Based on the embodiments in the present application, all other embodiments obtained by ordinary technicians in the art without creative efforts should fall within the scope of protection in the present application.

It is to be noted that the terms "first", "second" and the like in the description and claims of the present application and the above drawings are used for distinguishing similar objects, and need not be used to describe a specific order or sequence It is to be understood that the number used in this way can be interchanged under appropriate circumstances to facilitate the embodiments of the present application described herein. In addition, the terms "including" and "having" as well as any variation of them are intended to cover non-exclusive inclusion. For example, a process, method, system, product or device that contains a series of steps or units need not be limited to those steps or units that are clearly listed, but may include other steps or units that are not clearly listed or are inherent in these processes, methods, products or devices.

In the present application, the terms "installation", "provide", "dispose", "connection" and "linkage" should be understood broadly. For example, "connection" can be fixed connection, removable connection, or integral structure; it can be mechanical connection or electrical connection; it can be direct connection, indirect connection through an intermediate medium, or internal connection between two devices, elements or components. For those skilled in the art, the specific meaning of the above terms in the present application can be understood according to the specific situation.

It is noted that the embodiments in the present application and the features in the embodiments can be combined with each other without conflict. The present application will be described in detail below with reference to the accompanying drawings and in combination with embodiments.

Figure 1:
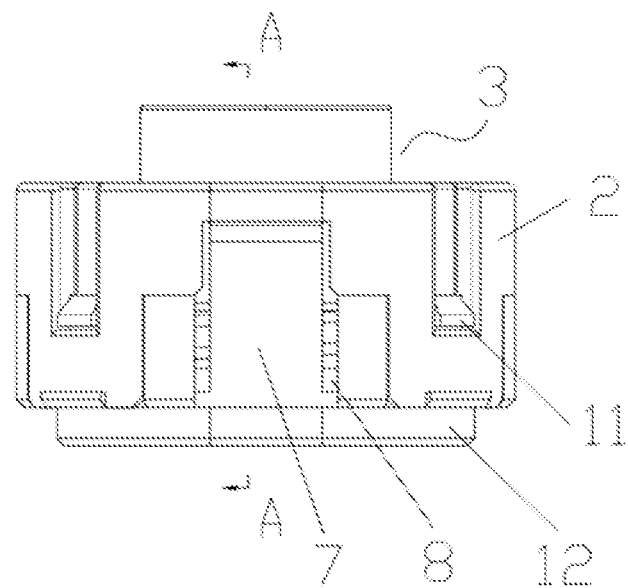
FIG. 1 is a structural schematic diagram of a game controller key according to the present application.
Figure 2:
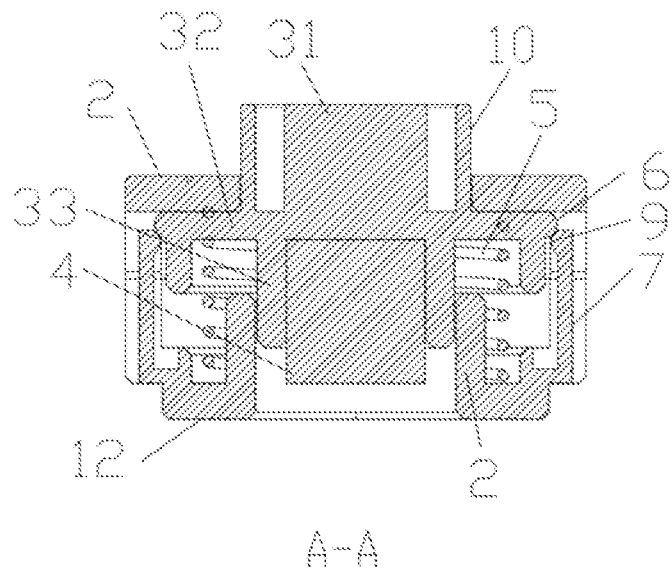
FIG. 2 is an A-A sectional view of FIG. 1.
Figure 3:
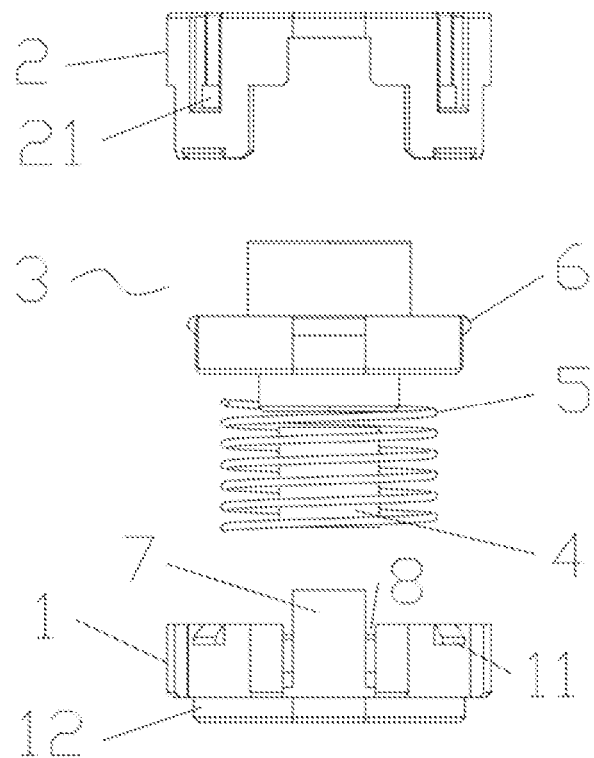
FIG. 3 is an exploded view of a first view structure of a game controller key according to the present application.
Figure 4:
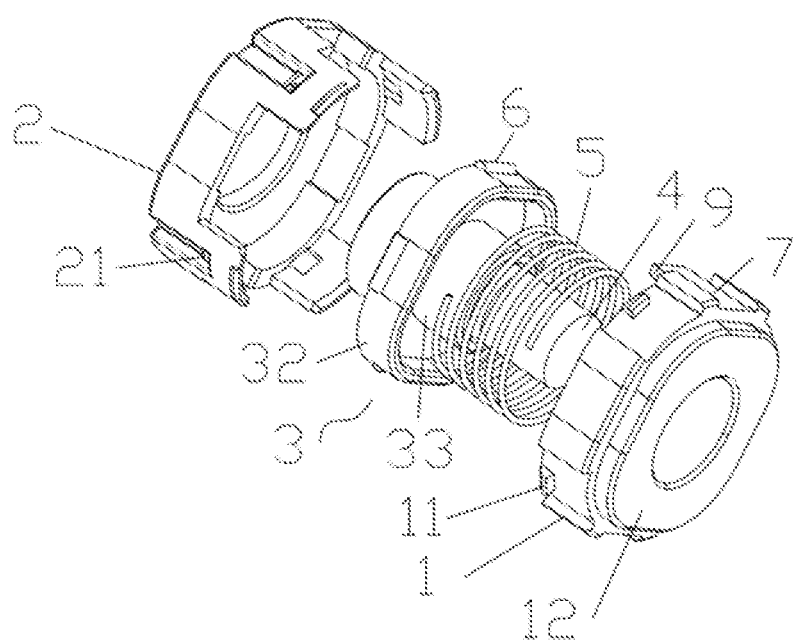
FIG. 4 is an exploded view of a second view structure of a game controller key according to the present application.
Figure 5:
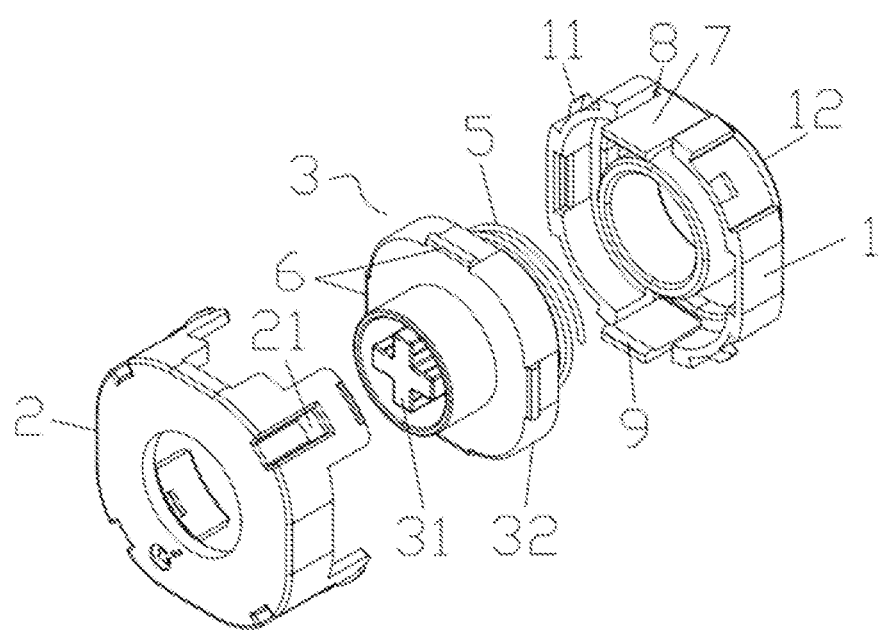
FIG. 5 is an exploded view of a third view structure of a game controller key according to the present application.

According to the embodiments of the present application, as shown in FIGS. 1-5, a game controller key in the present application includes a base 1, a casing 2 and a key switch 3; the casing 2 is fastened on the base 1 to form a cavity; the key switch 3 is disposed in the cavity; the top of the key switch 3 is exposed from a surface of the casing 2; conductive silica gel 4 is installed at the center of the bottom of the key switch 3; a through hole is provided at a position on the base 1 that corresponds to the conductive silica gel 4; a spring 5 is installed between the key switch 3 and the base 1; a side wall of the key switch 3 is provided with a first bump 6; a plate body 7 is installed on the base 1; a gap 8 is present between each of two sides of the plate body 7 and the base 1; and the plate body 7 is provided with a second bump 9 matching the first bump 6. The gap 8 is present, so that when the key switch 3 is pressed, the spring 5 is compressed, the key switch 3 extrudes the second bump 9 outwards through the first bump 6, the plate body 7 is driven to incline outwards by the second bump 9, and thus the force curve of a traditional conductive adhesive can be simulated.

The spring 5 is used for controlling the force of the key switch 3, the characteristics of good production consistency and long service life of the spring 5 are utilized, and the force of the spring 5 can be conveniently adjusted, so that various keys with different forces can be conveniently produced.

The key switch 3 is independently made, and meanwhile, the problems of key clamping, abrasion and uneven pressing of a key cap of a traditional game controller key are solved.

The key switch is independently made, so that the key cap can be conveniently replaced, and rapid mass production and personalized customization are realized.

Specifically, the key switch 3 includes a cross switch 31, a switch shell 32 and a sleeve 33; the cross switch 31 is installed on the top of the switch shell 32; the sleeve 33 is installed at the center of the bottom of the switch shell 32; the conductive silica gel 4 is installed in the sleeve 33; the top of the cross switch 31 is exposed from the surface of the casing 2; the spring 5 is installed between the switch shell 32 and the base 1; and the first bump 6 is disposed on the side wall of the switch shell 32.

The conductive silica gel 4 is used in the center part, and a contact of a contact circuit is still conductive adhesive, so that the hand feeling and the mute are guaranteed; and because the design of a traditional silica gel bowl is omitted, the silica gel bowl structure part which is most prone to breakage is avoided.

Preferably, in the present application, the first bumps 6 are disposed on four side walls of the switch shell 32, and two plate bodies 7 are installed at the positions, corresponding to the two opposite first bumps 6, of the base 1. According to the present application, the four first bumps 6 are disposed, so that production is facilitated and the installing efficiency is ensured; the four first bumps 6 guarantee that the switch shell 32 is directly connected with the base 1 without considering whether the first bumps 6 correspond to second bumps 9 on the plate bodies 7 or not, and the installation efficiency is improved.

Preferably, in the present application, the number of the second bumps 9 on the plate bodies 7 can be consistent with that of the first bumps 6, namely the number of the second bumps 9 and the number of the first bumps 6 are both four, but pressing the key switch 3 is strenuous due to such arrangement.

Preferably, in the present application, the number of the first bumps 6 of the switch shell 32 and the number of the second bumps 9 on the plate bodies 7 can be odd, such as one or three, but the key switch 3 is unevenly stressed during pressing, and abrasion of the first bumps 6 and the second bumps 9 is aggravated because of such number.

Specifically, the game controller key further includes a dustproof cap 10, and the dustproof cap 10 sleeves and disposed outside the cross switch 31 and is connected with the switch shell 32, so that dust can be effectively prevented from entering, and the service life is prolonged.

Specifically, the casing 2 is detachably connected with the base 1, which facilitates installing and replacing the key switch 3.

Specifically, a clamping groove 21 is formed in the casing 2; a clamping hook 11 matching the clamping groove 21 is disposed on the base 1; and the base 1 is connected with the clamping groove 21 of the casing 2 through the clamping hook 11.

Preferably, four clamping grooves 21 are disposed in the casing 2 and four clamping hooks 11 are disposed on the base 1, and thus the connection stability of the casing 2 and the base 1 is guaranteed.

Specifically, the casing 2 and the base 1 are both rectangular, which can effectively prevent the interference problem during key layout.

Specifically, because the casing 2 and the base 1 are both rectangular, the cavity formed by the casing 2 and the base 1 is also rectangular, thus the switch shell 32 is also rectangular, and matching of the switch shell 32 and the cavity is guaranteed.

Specifically, the first bump 6 and the second bump 9 are both hemispherical.

Specifically, the first bump 6 and the second bump 9 are both made of POM plastic, and the POM plastic is good in toughness, resistant to abrasion and long in service life.

Specifically, a step 12 is disposed at the bottom of the base 1; and due to the step 12, the key can be installed at the top or the bottom, so that the game controller with different modes and functions can be designed.

Specifically, one end, far away from the casing 2, of the plate body 7 is connected to the base 1, and the plate body 7 and the base 1 are of an integrated structure.

One end, far away from the casing 2, of the plate body 7 is connected to the base 1, so that when the key switch 3 extrudes the second bump 9 outwards through the first bump 6, the second bump 9 easily drives the plate body 7 to incline outwards; and the plate body 7 and the base 1 are of an integrated structure, so the structural strength can be improved.

Specifically, in order to facilitate relative sliding between the first bump 6 and the second bump 9, the surface of the first bump 6 and the surface of the second bump 9 are curved surfaces.

Specifically, the through hole is formed on the casing 2; the cross switch 31 and the dustproof cap 10 are exposed from the through hole which extends out of the casing 2; and the outer surface of the dustproof cap 10 is attached to the inner surface of the through hole of the casing 2.

The outer surface of the dustproof cap 10 is attached to the inner surface of the through hole of the casing 2, so that the dustproof cap 10 can seal the gap between the key switch 3 and the through hole of the casing 2, and dust is prevented from entering.

Specifically, in order to facilitate manufacturing of the key switch 3, the cross switch 31, the dustproof cap 10, the switch shell 32 and the sleeve 33 can be of an integrated structure, and thus the key switch 3 can be integrally formed during manufacturing.

Based on the same technical concept, the present application further provides a game controller which includes the abovementioned game controller key.

According to the game controller provided by the present application, the abovementioned game controller key is adopted, the installation mode of the game controller key can be flexibly set, for example, the game controller key can be installed at the top or the bottom; the game controller key further has the technical effect of simulating the force curve of traditional conductive adhesive; the spring 5 is used for controlling the force of the switch key 3, the characteristics of good production consistency and long service life of the spring 5 are utilized, and the force of the spring 5 can be conveniently adjusted, so that various keys with different forces can be conveniently produced; the key switch 3 is independently made, and meanwhile, the problems of key clamping, abrasion and uneven pressing of a key cap of a traditional game controller key are solved; and the key cap can be conveniently replaced, and rapid mass production and personalized customization are realized.

Although the embodiments of the present application are described in combination with the drawings, those skilled in the art can make various modifications and variations without departing from the spirit and scope of the present application. Such modifications and variations fall within the scope defined by the appended claims.

What is claimed is:

1. A game controller key, comprising a base, a casing and a key switch; wherein the casing is fastened to the base to form a cavity; the key switch is disposed in the cavity; a top of the key switch is exposed from a surface of the casing; conductive silica gel is installed at a bottom of the key switch; a through hole is provided at a position on the base, wherein the position on the base corresponds to the conductive silica gel; a spring is installed between the key switch and the base; a side wall of the key switch is provided with a first bump; a plate body is installed on the base; a gap is present between each of two sides of the plate body and the base; and the plate body is provided with a second bump matching the first bump.

2. The game controller key according to claim 1, wherein the key switch comprises a cross switch, a switch shell and a sleeve; wherein the cross switch is installed on a top of the switch shell; the sleeve is installed at a bottom of the switch shell; the conductive silica gel is installed in the sleeve; a top of the cross switch is exposed from the surface of the casing; the spring is installed between the switch shell and the base; and the first bump is disposed on a side wall of the switch shell.

3. The game controller key according to claim 2, further comprising a dustproof cap, wherein the dustproof cap sleeves the cross switch and is connected to the switch shell.

4. The game controller key according to claim 1, wherein the casing is detachably connected to the base.

5. The game controller key according to claim 4, wherein a clamping groove is formed in the casing; and a clamping hook matching the clamping groove is installed on the base.

6. The game controller key according to claim 2, wherein the casing and the base are rectangular.

7. The game controller key according to claim 6, wherein the switch shell is rectangular.

8. The game controller key according to claim 1, wherein the first bump and the second bump are semispherical.

9. The game controller key according to claim 1, wherein the first bump and the second bump are made of polyformaldehyde (POM) plastic.

10. The game controller key according to claim 1, wherein a step is disposed at a bottom of the base.

11. The game controller key according to claim 1, wherein an end, of the plate body is connected to the base, wherein the end of the plate body is away from the casing; and the plate body and the base are of an integrated structure.

12. The game controller key according to claim 1, wherein a surface of the first bump and a surface of the second bump are curved surfaces.

13. The game controller key according to claim 3, wherein the through hole is formed on the casing, and the cross switch and the dustproof cap are exposed from the through hole, wherein the through hole extends out of the casing; and an outer surface of the dustproof cap is attached to an inner surface of the through hole of the casing.

14. The game controller key according to claim 3, wherein the cross switch, the dustproof cap, the switch shell and the sleeve are of an integrated structure.

15. A game controller, comprising the game controller key according to claim 1.

16. The game controller according to claim 15, wherein in the game controller key, the key switch comprises a cross switch, a switch shell and a sleeve; wherein the cross switch is installed on a top of the switch shell; the sleeve is installed at a bottom of the switch shell; the conductive silica gel is installed in the sleeve; a top of the cross switch is exposed from the surface of the casing; a second spring is installed between the switch shell and the base; and the first bump is disposed on a side wall of the switch shell.

17. The game controller according to claim 16, wherein the game controller key further comprises a dustproof cap, wherein the dustproof cap sleeves the cross switch and is connected to the switch shell.

18. The game controller according to claim 15, wherein in the game controller key, the casing is detachably connected to the base.

19. The game controller according to claim 18, wherein in the game controller key, a clamping groove is formed in the casing; and a clamping hook matching the clamping groove is installed on the base.

20. The game controller according to claim 16, wherein in the game controller key, the casing and the base are rectangular.

\* \* \* \* \*